Dec. 24, 1935.  E. G. SPANGLER  2,025,076
METERING VALVE
Filed Dec. 13, 1933  2 Sheets-Sheet 1

INVENTOR
EARL G. SPANGLER
BY
Hazard & Miller
ATTORNEYS

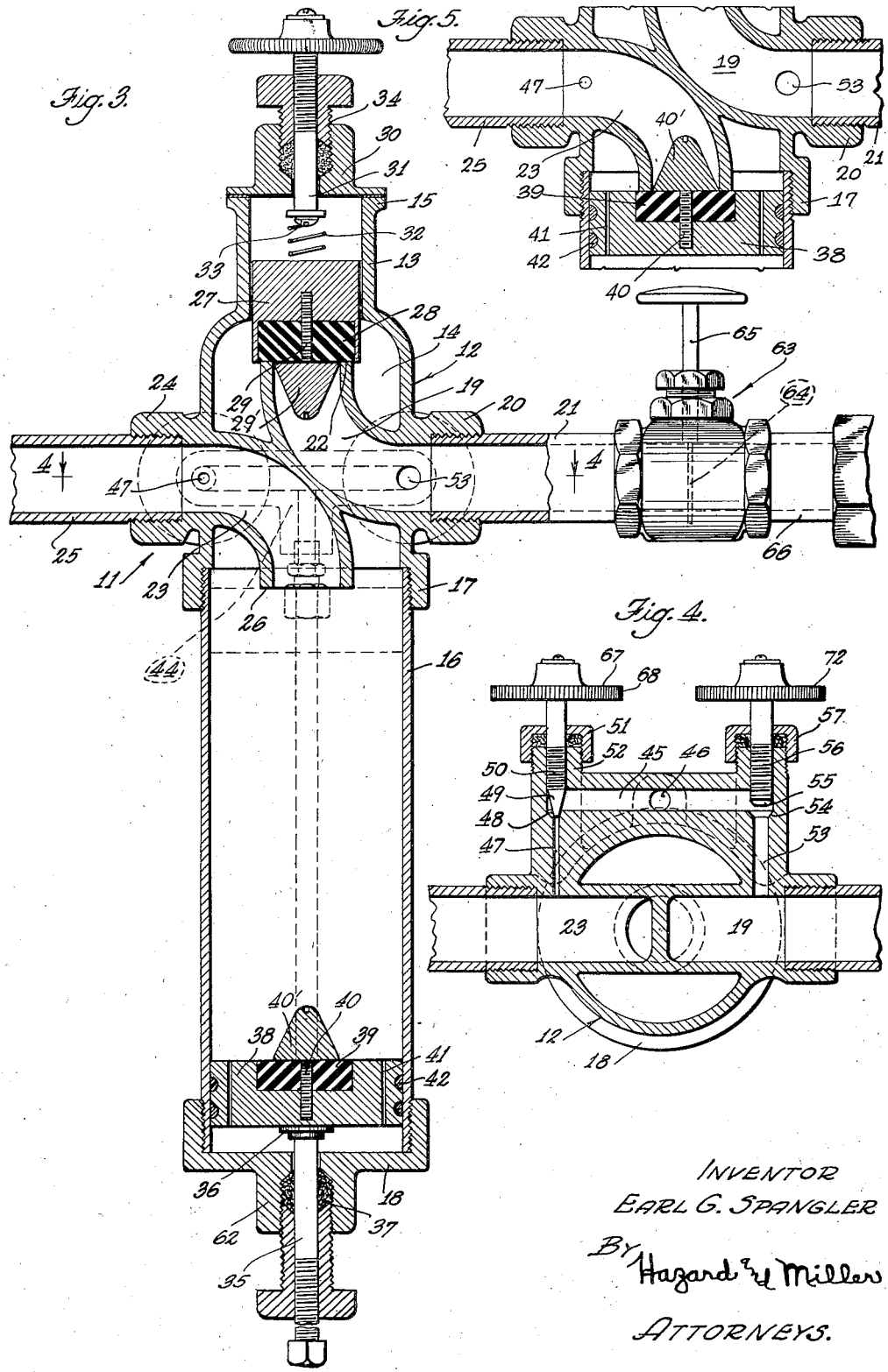

Patented Dec. 24, 1935

2,025,076

UNITED STATES PATENT OFFICE 2,025,076

METERING VALVE

Earl G. Spangler, Los Angeles, Calif.

Application December 13, 1933, Serial No. 702,222

28 Claims. (Cl. 221—101)

My invention relates to a metering valve for metering a liquid in which differential hydraulic pressures function to close the valve after a predetermined amount of liquid has passed therethrough.

My metering valve is of a type designed to meter time after time substantially the same quantity of a liquid, such as water, and has a manual control element by which the valve may be started metering and after a predetermined amount of liquid has passed through the valve the differential pressures of the liquid in the inlet and outlet close the valve and stop the discharge of such valve.

Another object and feature of my invention is a valve which, on closing the manual control, automatically, through the pressures in the valve body, sets the valve for a second operation when the manual control is open. Such manual control is, preferably, a valve in the feed or supply pipe, in which pipe the pressure should be kept constant.

A further object and feature of my invention is the construction of a metering valve having an inlet with an automatically opening valve plug or piston which is opened when subjected to the pressure of the feed pipe. The valve has an outlet which is also automatically closed by a second moving plunger or piston, this being actuated into a closing position by the difference in the pressure on the inlet and outlet side of the valve, such difference of pressure causing a movement of the second piston or plunger to the outlet closing position.

A further object and feature of my invention is an adjustment for the second plunger or piston by which the distance of traveling of this may be regulated and, hence, the time during which the valve is open for discharge of liquid may be varied.

A further feature of the valve as a whole is the inclusion of a regulated valve in the form of a needle valve which regulates and adjusts the flow of the inlet liquid which has a connection to move or raise the second plunger or piston to close the outlet of the valve.

In constructing the valve I employ a housing with a large and a small cylinder in alignment. In the small cylinder there is the first plunger or piston and in the large or second cylinder there is the second plunger or piston. The feed pipe is connected, preferably, to a curved pipe in the housing which has an inlet seat, which is normally closed by the first plunger resting thereon by gravity, the cylinders, preferably, being in a vertical position with the small cylinder uppermost. The outlet pipe or discharge from the valve housing has a downwardly curved segment inside of the housing with a downwardly facing valve seat to be engaged and closed by the upward movement of the second plunger or piston.

The control of the second plunger or piston is through the medium of a liquid connection from a T type of passage. One end of the T is connected to the inlet and the other end to the outlet ducts and each of these employs an adjusting control valve, the inlet having a valve to give a fine adjustment to regulate the speed with which pressure may be built up below the second plunger or piston. The second adjusting valve is a bleeder valve for the purpose of equalizing the pressure on both sides of the second piston and allowing this to fall by gravity in the second cylinder.

Another feature of my invention is the employment of a restricting cone on the second moving plunger, which gradually reduces the outlet on closing and this gradually retards the velocity of the liquid, preventing a hammer action.

My invention is illustrated in connection with the accompanying drawings, in which:

Fig. 3 is a vertical section on the line 3—3 of Fig. 2 in the direction of the arrows.

Fig. 4 is a horizontal section on the line 4—4 of Fig. 3 in the direction of the arrows.

Fig. 5 is a partial section similar to Fig. 3, showing the outlet closed.

Figure 1:
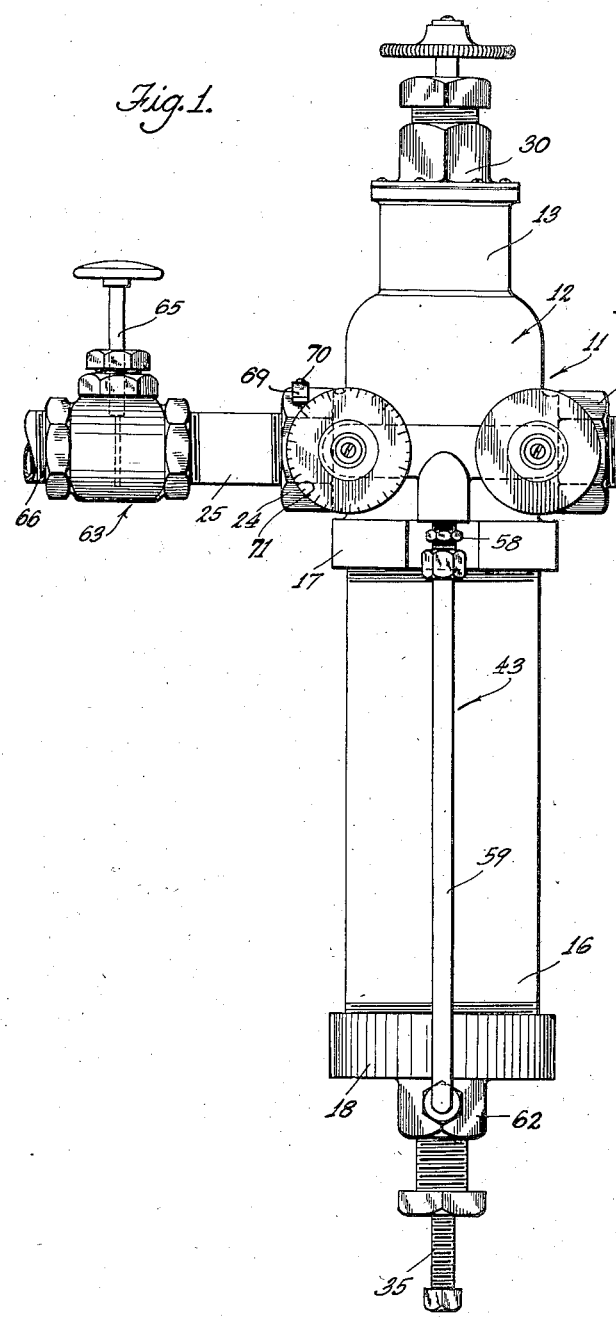
Fig. 1 is an elevation taken in the direction of the arrow 1 of Fig. 2.
Figure 2:
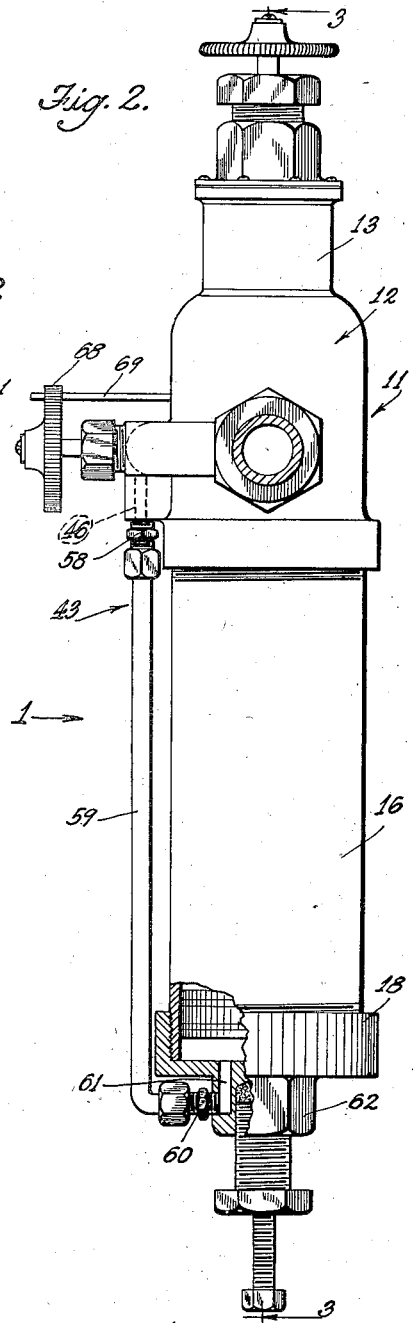
Fig. 2 is an elevation taken in the direction of the arrow 2 of Fig. 1.

In my invention I employ a valve housing 11, which is illustrated as having a central casting 12. This has a cylinder 13 of relatively small bore at the top and an enlarged circulating chamber 14 therebelow. A flange 15 is at the upper end of the cylinder 13. A large cylinder 16 is connected by a threaded connection 17 to the casting or valve block 12. A closure head 18 is threaded on the lower end of the cylinder 16.

The hollow valve block 12 is provided with a curved inlet duct 19, which has an external neck 20 to which the feed or supply pipe 21 is connected. This duct 19 terminates in a horizontal valve seat 22 facing upwardly. A discharge duct 23 has an external neck 24 with a discharge pipe 25 connected thereto. This has a downwardly facing valve seat 26.

A first or inlet valve plug or piston 27 operates in the cylinder 13. This has a resilient pad 28 retained by a screw 29 to bear on the seat 22 of the inlet duct 19. A cap 30 is mounted on the flange 15 and has a stem 31 passing therethrough. This stem has a compression spring 32 secured thereto by means of a screw 33. Normally the lower end of the spring is positioned above the plunger 27. A gland with packing 34 forms a leak-proof joint on the stem 31. The closure head 18 has a supporting stem 35 passing upwardly therethrough. This is provided with an enlarged inner head 36. This stem is provided with a gland and packing 37 to form a leak-proof seal for the stem 35. The second or larger plunger or piston 38 is designed to rest on the head 36. This has a resilient pad 39 held in place by a screw 40. A plurality of small liquid ducts 41 extend through the plunger or piston 38. There are also a plurality of annular grooves 42 to form a liquid seal.

The differential pressure connection designated by the assembly numeral 43 employs a T-shaped duct 44. This has a horizontal section 45 and a vertical section 46. From the horizontal section there is a horizontal bleeder duct 47 at right angles thereto which communicates with the outlet duct 23 immediately inside of the neck 24. This duct has a valve seat 48 and is closed by a needle valve 49 on the threaded stem 50. This stem is made leak-proof by means of a gland and packing 51 threaded on a nub 52 of the casting 12.

A supply duct 53 connects from the opposite end of the horizontal duct 45 to the inlet duct 19 adjacent the neck 20. This has a valve seat 54 closed by the valve end 55 of a screw-threaded stem 56, which stem extends through a nub similar to 52 and is formed leak-proof by means of a gland and packing 57.

A nipple 58 is connected to the vertical section 46 of the T-shaped duct 44 and from this there is a vertical pipe 59 which leads to a lower nipple 60 which is connected to a vertical duct 61 in a projection 62 on the lower head 18. This duct 61 communicates with the bottom of the cylinder 16 below the plug or piston 38.

The supply or feed pipe 21 is provided with a manually operative control valve 63 which is illustrated as having a vertically sliding gate 64 manipulated by raising or lowering a stem 65, this being for the purpose of giving a quick adjustment. In the section 66 of the feed pipe there should be inserted a pressure equalizer.

The stem 50 of the needle valve 49 is provided with a disk-like handle 67 which has serrations 68 on its periphery, these being engaged by a strap spring 69, one end of which 70 is secured to the casting 12. This disk is provided with graduations 71 and is a regulating valve. A somewhat similar disk handle 72 is on the stem 56 but is not necessarily held in adjustment by a spring.

The manner of operation and functioning of my valve assembly is as follows:

When the control valve 63 is closed, the whole of the valve housing 11 is filled with liquid. The plunger or piston 27 preferably has a somewhat loose fit in the cylinder 13. Therefore, liquid may be above this piston. On account of the differential pressure connection 43 there is a liquid below the large piston 38. The upper piston 27 rests on the valve seat 22 of the inlet duct 19. As soon as the control valve 63 is opened, which should be done quickly, there is a greater pressure in the inlet duct 19 than in the outlet duct 23. This causes a transfer of pressure and flow of liquid through the blunt valve 54 by medium of the ducts 47, 45, 46, the pipe 59, and the duct 61 to the lower end of the cylinder 16 below the large piston 38. As this pressure is greater than the pressure above this piston, the large piston starts an upward movement and the continued supply of liquid below this piston is through the connection described immediately above.

Substantially at the same time that the increased pressure in the inlet duct starts the upward movement of the lower piston 38, the upper smaller piston 27 is unseated and permits a flow of liquid through the duct 19 into the chamber 14 and causes an outward flow from the upper part of the cylinder 16 through the outlet duct 23 to the discharge pipe 25. This continues until the piston 38 bears on the valve seat 26 of the discharge duct 23. When the outlet is closed, no more liquid may be discharged from the valve. As long as the control valve 63 is open there will be a greater pressure below the piston 38 than in the discharge duct 23 and thus hold this duct closed. However, immediately the control valve 63 is closed, the bleeder valve 49 functions, allowing a pressure transference through the horizontal duct 45, the duct 53, to the outlet duct 23, thus equalizing the pressure below the piston 38 and in the outlet duct 23. The piston then drops downwardly through the liquid in the cylinder 16, such liquid passing upwardly through the small ducts 41 in this piston, such piston coming to rest on the head 36 of the adjusting stem 35. The spring 32 is very light and readily allows upward movement of the upper piston 27 due to the action of the liquid pressure from the inlet, and also starts a movement of this piston downwardly when the control valve 63 is closed and the pressure equalized in the valve assembly.

The small ducts 41 in the piston 38 are of insufficient size to permit a flow of water which would interfere with the action of the secondary valve when this piston is moving upwardly due to the flow from the inlet to the lower end of the large cylinder 16, but these are of sufficient cross section when the pressure is equalized in the valve housing and below the piston 38 and the outlet duct 23 to allow the downward drop of the piston 38 due to gravity, the liquid below this piston flowing upwardly through these ducts 41.

The weight of the piston 27 of the primary valve resting on the inlet valve 22 is sufficient to cause a static pressure in the inlet sufficient to substantially equal the resistance of the flow of the diverted and operating liquid through the valve 55 and the pipe 59 to the lower end of the cylinder 16 so that immediately the control valve 63 is opened, water starts to flow through the diverting connection to the bottom of the cylinder 16 and elevates the piston 38. The speed of movement of the piston 38 is controlled by the valve 55; the greater the opening of this valve, the faster is the movement of the piston 38, and vice versa, thus controlling the time of the discharge of water through the outlet. The spring 32 is designed mainly to limit the upward movement of the piston 27. When this piston is fully opened the cross sectional area of flow through the primary valve 22 of the inlet is not as great as the cross sectional area of the inlet end of the outlet duct 23 until, of course, the lower piston 38 approaches the secondary valve seat 26.

The adjustment by the stem 35 is mainly to adjust the time of the return of the secondary piston 38 from its closure position with the secondary valve seat 26. In some cases the cycle of operation of the valve, that is, from initiating one discharge to another, requires a quicker resetting of the valve after a complete discharge of a desired quantity of liquid. Therefore, by raising the stem 35, the distance of drop of the piston 38 is regulated. The speed of this drop is substantially constant as it is due to gravity.

The bleeder valve 49 may have quite a small opening so that there is no appreciable flow through the by-pass 45 between the inlet duct 19 and the outlet duct 23. Hence, this substantially only functions to equalize the pressures in the valve housing when the secondary valve is closed.

The valve, as a whole, may be adjusted and calibrated as follows:

The stem 35 is set in one position, the stem 31 and the spring 32 also in a first position, then with a known pressure in the supply line it will be found that a certain quantity of liquid is discharged. This quantity may be regulated by adjustment of the valve 55 until the desired volume of liquid is discharged at each operation of the control valve 63. For different pressures in the supply pipe, the stems 31 and 35 may be left in their initial position and adjustment made of the valve 55 to obtain the same discharge if the same quantity of liquid is desired at each operation. Changing the adjustment of the stem 35 and of the stem 31 to vary the downward thrust on the opened valve 27 will, of course, vary the quantity discharged at each operation of the valve. It will be necessary to recalibrate for different positions of these stems 31 and 35. The control valve may be placed on the discharge pipe 25 provided the liquid is being discharged above the valve or against the hydraulic head greater than that due to the elevation of the primary valve seat so that no air could enter through the discharge pipe.

As above mentioned, by adjusting the height of the head 36 on the stem 35 in the cylinder 16, the piston 38 may be raised or lowered and thus the length of its path varied, which gives a different time factor in the gradual closing or shutting off of the discharge valve. By regulating the opening of the needle valve 49, the amount of liquid flowing through the valve system may be regulated to be constant for each action of the valve provided the feeding pressure of the supply line is maintained constant.

A restricting cone 40' is secured by the screw 40 to the plunger or piston 38 above the resilient pad 39. This is for the purpose of gradually restricting the outlet duct 23 when the pad 39 is brought into proximity to the valve seat 26 of the outlet. As this restricting cone enters the outlet and is brought into the position of Fig. 5, it will gradually decrease the cross-sectional area of discharge and thus gradually reduce the velocity of the liquid through the valve, and bring such liquid to a gradual stop. It thus reduces the hammer effect, which might, otherwise, be produced by liquid flowing at comparatively high velocity, possibly high pressure, when brought to a sudden stop.

The control valve 63 may be placed in the discharge pipe 25 and have the same function in controlling the flow and discharge of liquid. With this valve in the discharge pipe, when the valve is closed, there is equal pressure at all places in the large cylinder 16 and the small cylinder 13 and below the plunger 38. On opening the valve, the pressure is lessened in the discharge pipe 25 and discharge duct 23, due to the free outlet for the liquid. This develops a differential pressure, being less above the plunger 38 than below, and this plunger rises until it closes on the seat 26. During this discharge, the bleeder valve is continuously leaking, but the small discharge from this valve passes out through the pipe 25, this being a very small amount. However, when the control valve in the discharge pipe 25 is closed, the leak through the bleeder valve builds up a pressure in the discharge duct 23 above the plunger 38, which is closed on the valve seat 25, and this again equalizes the pressures in the whole valve and permits dropping of the plunger 38. The valve in the outlet prevents air from getting into the meter valve.

It is to be understood that my metering valve may be used for metering gases as well as for liquids. In metering gases it is desirable that the inlet valve plug 27 and the large plunger 38 be made relatively light. This may be accomplished by making these of aluminum. Also, the ducts 41 should be quite small, or these may be entirely eliminated and rely on the leakage of the gas past the plunger 38 to allow this to descend.

An alternative manner of operating my metering valve is by operating a valve between the connection 53 to the inlet and the connection through a section of the duct 45, the vertical duct 46 and the pipe 59 to the projection 62 and thus to the underside of the movable secondary valve 38. In the construction as illustrated, I employ a valve 55 which may close against the seat 54 to open and close the connection from the inlet 53 to the underside of the secondary valve 38. Where it is desired to use a cylinder 16 of comparatively short length, the valve 55 may be closed before the main control valve 63 is open. Hence when 63 is opened and 55 is closed, there may be a direct flow of water through the metering valve but no differential pressure between the inlet and the underside of the secondary valve 38. However, shortly before the time it is desired to stop the flow, the valve 55 may be opened, thus the differential pressure underneath the secondary valve 38 is created and this valve slowly moves upwardly to close the outlet at the seat 26. This gives a comparatively slow action in stopping the flow and a valve such as 55 in the connection between the inlet 53 and the underside of the secondary valve 38 may be manipulated with materially less power than that required to actuate the main control valve 63. Moreover, stopping the flow of the metering valve in this manner does not give a "water hammer" effect which might be the case if the main valve 63 were suddenly closed.

When the metering valve has caused the first action in the above manner by opening the valve 55 or an equivalent valve it also opens the by-pass through the duct 45 past the needle valve 49 and the bleeder duct 47 to the outlet side of the valve equalizing the pressure above and below the secondary movable valve element 38 and allowing this to drop by gravity.

Various changes may be made in the details of construction without departing from the spirit or construction of the invention as defined by the appended claims.

I claim:

1. A metering valve having a liquid inlet with a primary valve and a liquid outlet with a secondary valve, means operated by liquid pressure to open the primary valve and discharge liquid through the secondary valve, means operated by the differential pressures in the inlet and outlet to close the secondary valve and thus shut off discharge of liquid through the metering valve.

2. A metering valve as claimed in claim 1, the means operated by differential pressure comprising a secondary movable valve element, a liquid connection from the inlet to the side of said element remote from the outlet whereby said secondary valve element is moved to form a closure with the secondary valve.

3. A metering valve comprising, in combination, an inlet and an outlet, the outlet having a secondary valve, a supply line to the inlet having a control valve, the opening of the control valve admitting liquid under pressure to the inlet and the flow of liquid in the valve to the outlet, and a differential liquid connection operative between the inlet and the body of the valve to close the secondary valve and thereby prevent discharge of liquid from the metering valve.

4. A metering valve as claimed in claim 3, the secondary valve having a movable valve element, and means operative on the closing of the control valve in the supply line to allow opening of the secondary valve.

5. A metering valve as claimed in claim 3, the secondary valve having a movable valve element, a by-pass connection from the inlet to the outlet, a liquid connection from the by-pass to said element on the side opposite from the secondary valve whereby the inlet pressure may actuate the movable element of the secondary valve to bring same into closed position with said secondary valve.

6. A metering valve comprising, in combination, a valve housing having an inlet with a primary valve in the housing forming a closure therefor, an outlet having a secondary valve with a slidable element to form a closure, a supply pipe connected to the inlet, a liquid connection from the inlet between the supply pipe and the primary valve to a position in the housing to move the movable element of the secondary valve and to bring said element into closing relation with the secondary valve and thus shut off discharge from the valve housing.

7. A metering valve as claimed in claim 6, said liquid connection having a by-pass to the outlet on the discharge side of the secondary valve, and a regulated valve in said liquid connection.

8. A metering valve having a valve housing with a supply pipe connected thereto, an inlet at the supply pipe, an outlet having a secondary valve, said secondary valve having a cylindrical structure with a movable piston or plunger therein, a liquid connection from the inlet to the cylinder on the side of the plunger remote from the secondary valve whereby the inlet pressure and flow of liquid may move the plunger into closed relation with the secondary valve and shut off discharge of the metering valve, the inlet having a primary valve opened when acted upon by a pressure in the inlet greater than that in the valve housing and occupying a liquid flow between the inlet and the outlet in the housing.

9. A metering valve as claimed in claim 8, the supply pipe having a control valve, the inlet having a primary valve, and a by-pass connection between the inlet and the outlet and connected to the end of the cylinder on the side of the plunger remote from the outlet.

10. A metering valve having a valve housing with a central block and a first and a second cylinder connected thereto, the second cylinder being larger than the first, a connection for a supply pipe, an inlet duct connected thereto with a valve seat facing the smaller cylinder, a discharge opening having an outlet duct with a valve seat facing the larger cylinder, a first plunger in the smaller cylinder positioned to form a closure for the seat of the inlet, a second plunger in the larger cylinder movable to form a closure for the outlet seat, a by-pass between the inlet and outlet ducts, and a liquid connection from said by-pass to the larger cylinder on the side of the plunger remote from the outlet seat.

11. A metering valve as claimed in claim 10, the by-pass having a regulating valve on the inlet end and a bleeder valve on the outlet end, and said pistons having means for bleeding of the liquid from one side to the other.

12. A metering valve comprising, in combination, a valve housing having a central block with an inlet opening, a supply pipe connected thereto having a control valve, an inlet duct connected to the supply opening and having an upwardly facing primary valve seat, said block having an outlet opening with an outlet duct having a downwardly facing secondary valve seat, said block having an upper cylindrical extension and a lower cylindrical extension, the lower extension being of larger diameter than the upper extension, a primary plunger piston slidably mounted in the upper cylinder and a secondary plunger piston slidably mounted in the lower cylinder, a by-pass connection between the inlet and outlet ducts, a connection from said by-pass to the lower part of the lower larger cylinder below the plunger piston in said cylinder, a regulating valve in the inlet connection of the by-pass, and a bleeder valve in the outlet connection of said by-pass, and means to permit drainage of liquid past both of the pistons.

13. A metering valve as claimed in claim 12, means connected to the lower cylinder to adjust the position of the secondary piston plunger, and means connected to the upper and smaller cylinder having a spring to adjust a pressure on the upper piston plunger when said plunger becomes displaced from its seat.

14. A metering valve comprising, in combination, a valve housing having a central block with an inlet opening, a pipe connected thereto, an inlet duct connected to the inlet opening and having a primary valve seat with a movable primary valve to seat thereon, said block having an outlet opening having an outlet duct having a downwardly facing secondary valve seat, said block having a cylindrical downward extension, a piston plunger slidable therein and having a restricting cone thereon, the restricting cone being adapted to enter the outlet duct and gradually retard the velocity of liquid through the valve, and said plunger bearing against the secondary valve seat, a by-pass connection between the inlet and outlet ducts, a connection from said by-pass to the lower part of the cylinder below the plunger piston, a pipe connected to the outlet duct, and a control valve in one of said pipes.

15. A metering valve as claimed in claim 14, having a restricting cone on the primary valve adapted to enter the outlet at the primary valve seat and gradually vary the velocity of the liquid passing through such primary valve.

16. A metering valve having a valve structure with a liquid inlet pipe connected thereto, a primary valve in the structure, a liquid outlet having an outlet pipe connected thereto, a secondary valve for the liquid outlet, a control valve in either of said pipes, means operated by liquid pressure to open the primary valve and discharge liquid through the secondary valve, means operated by the differential pressure in the inlet and outlet to close the secondary valve and thus shut off discharge of liquid through the metering valve.

17. A metering valve having a hollow structure with a cylindrical section extending downwardly, an inlet discharging upwardly, an outlet having a downwardly turned valve seat, a movable valve closure element in the cylindrical section, means to support said element above the bottom of the cylindrical section, said valve having passages from the inlet to the lower portion of the cylindrical section to create a differential pressure between the lower part of the cylinder and the outlet and thus permit said valve element to form a closure at the valve seat of the outlet.

18. A metering valve as claimed in claim 17, an additional by-pass connection from the outlet to the bottom of the cylinder to equalize the pressure in the outlet and below the movable element closure, said valve closure having means for flow of liquid from its lower to its upper side.

19. In a metering valve, a hollow valve structure having an inlet and an outlet separated one from another, the liquid flowing through the hollow structure of the valve from the inlet to the outlet, a main control valve to start and stop such flow, a movable valve closure element to cooperate with the outlet, means to create a differential pressure between the inlet and one side of the said valve closure, when the main valve is open, whereby said differential pressure causes a movement of the said valve closure element to close the outlet.

20. In a metering valve as claimed in claim 19, the means to create the differential pressure comprising a liquid connection between the inlet and one side of the said valve closure element, said connection having a valve therein, which latter valve may be closed when the main valve is open to prevent a differential pressure, and may be opened when the main valve is open to develop a differential pressure.

21. In a metering valve as claimed in claim 19, the means to create the differential pressure comprising a liquid connection between the inlet and one side of the said valve closure element, said connection having a valve therein, which latter valve may be closed when the main valve is open to prevent a differential pressure and may be opened when the main valve is open to develop a differential pressure, and a liquid connection between the inlet and the outlet through a bleeder and operative when the movable valve element closes the outlet to develop an equalized pressure on both sides of said movable valve closure element, said hollow valve structure and the movable valve closure element being constructed and positioned whereby the movable valve closure may open the outlet when the pressures on both sides of the movable valve closure are equalized and the movable valve closure is in closing relation with the outlet.

22. In a metering valve as claimed in claim 19, a liquid connection between the inlet and the outlet through a bleeder and operative when the movable valve element closes the outlet to develop an equalized pressure on both sides of said movable valve closure element, said hollow valve structure and the movable valve closure element being constructed and positioned whereby the movable valve closure may open the outlet when the pressures on both sides of the movable valve closure are equalized and the movable valve closure is in closing relation with the outlet.

23. In a metering valve having a valve housing with a supply pipe connected thereto, an inlet at the supply pipe, an outlet having a secondary valve, a main control valve in either the inlet or the outlet, said secondary valve having a cylindrical structure with a movable piston or plunger therein, a liquid connection from the inlet to the cylinder on the side of the plunger remote from the secondary valve, whereby when the main valve is open the inlet pressure and flow of liquid may move the plunger in closed relation with the secondary valve and shut off discharge of the meter valve.

24. In a metering valve as claimed in claim 23, a valve in the said liquid connection located between the inlet to the cylinder and the side of the plunger remote from the secondary valve.

25. A metering valve having a liquid inlet with a primary valve and a liquid outlet with a secondary valve, means operated by liquid pressure to open the primary valve and discharge liquid through the secondary valve, a liquid connection from the inlet to create a differential pressure between the inlet and the outlet, a valve in said connection to prevent or allow creation of such differential pressures, whereby when said latter valve is open, the secondary valve is gradually closed to shut off discharge of liquid through the metering valve.

26. A metering valve having a valve structure with a liquid inlet pipe connected thereto, a liquid outlet having an outlet pipe connected thereto, a secondary valve for the liquid outlet, a control valve in either of said pipes, a liquid connection to create a differential pressure between the inlet and the outlet when the control valve is open, a valve in said connection, said latter valve when open permitting development of the differential pressure to close the secondary valve and thus shut off the discharge of liquid through the metering valve.

27. A metering valve having a valve structure with a liquid inlet pipe connected thereto, a primary valve in said structure, a liquid outlet having an outlet pipe connected thereto, a secondary valve for the liquid outlet, a control valve in either of said pipes, means operated by liquid pressure to open the primary valve and discharge liquid through the secondary valve, a liquid connection from the inlet to the valve structure, a valve in said connection, said latter valve when open being operative to develop a differential pressure in the inlet and outlet to close the secondary valve and thus shut off discharge of liquid through the metering valve.

28. A metering valve as claimed in claim 27, a by-pass between the inlet and outlet to equalize the pressure on both sides of the secondary valve when such secondary valve is closed, and means operative with the secondary valve to open said secondary valve.

EARL G. SPANGLER.